Aug. 27, 1929.  A. D. ROSE  1,726,314
MAGNIFYING DEVICE FOR GAUGES AND THE LIKE
Filed Nov. 24, 1924
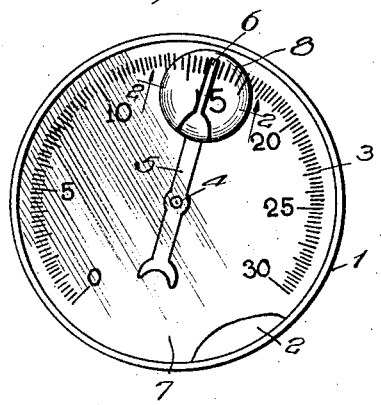
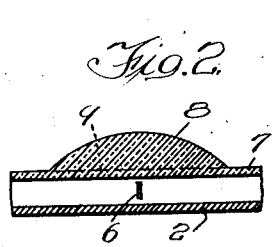
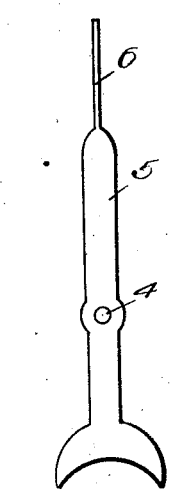
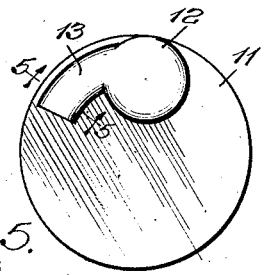
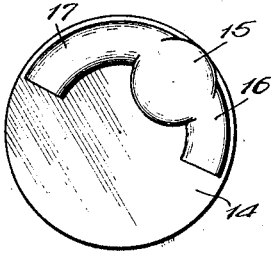
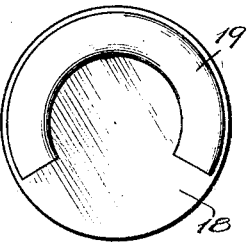
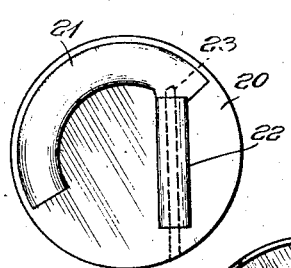
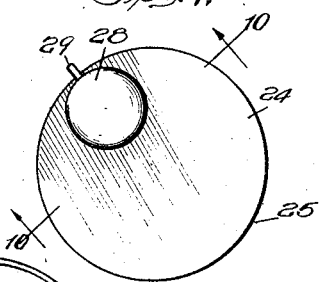
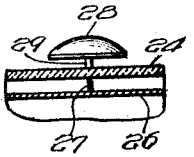
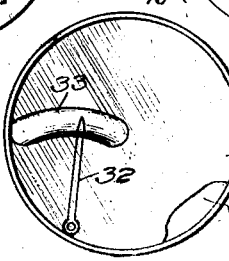
Inventor:
Alexander D. Rose

Patented Aug. 27, 1929.

1,726,314

UNITED STATES PATENT OFFICE.

ALEXANDER D. ROSE, OF CHICAGO, ILLINOIS, ASSIGNOR TO JAS. P. MARSH & COMPANY, OF CHICAGO, ILLINOIS, A CORPORATION OF ILLINOIS.

MAGNIFYING DEVICE FOR GAUGES AND THE LIKE.

Application filed November 24, 1924. Serial No. 751,910.

My invention belongs to that general class of devices known as gauges or the like, and relates more particularly to an instrument provided with a glass face or cover plate through which certain indications or recorded indications may be seen. The same more particularly relates to a device adapted to facilitate close and accurate readings. The same is applicable for pressure and vacuum indicating gauges, recording gauges and thermometers and like indicating or recording instrument, wherein there is provided a dial, scale or chart from which readings are to be taken. The invention has among its objects the production of a device of the kind described that is simple, convenient, efficient, reliable and satisfactory for use wherever found applicable. More particularly it has as an object the production of a device of the kind described which will facilitate the readings on a gauge, thereby permitting the taking of accurate readings, as well as small variations in the readings. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a plan view of the gauge with my improved magnifier applied;

Fig. 2 is an enlarged sectional view taken substantially on line 2—2 of Fig. 1;

Fig. 3 is a plan view of an indicator;

Fig. 4 is a plan view of another type of magnifier;

Fig. 5 is a section taken substantially on line 5—5 of Fig. 4;

Figs. 6, 7 and 8 are views similar to Fig. 4 illustrating modified constructions;

Fig. 9 is a face view of the gauge illustrating another modified construction;

Fig. 10 is a sectional view taken substantially on line 10—10 of Fig. 9; and

Fig. 11 is a plan view of a recording gauge with my device applied thereto.

As is well known, in many instances gauges of various types for indicating pressures or vacuum, or gauges for recording the information such as pressure, vacuum, temperature, etc., are so mounted that it is often difficult and many times impossible to accurately read the gauge, at least, to read the gauge to a close figure. Of course, in some cases, a strictly accurate reading is not required, while in others it is very desirable even though not essential. With my improved construction, readings may be read very closely, even at a considerable distance from the instrument, and even though the light may be to some extent poor.

Referring to the drawings, in which the preferred embodiment of the invention is shown, 1 represents a gauge of any suitable construction provided with a dial 2 upon which are the desired graduations 3, 5 being an indicator or pointer, which, in the instance shown, is mounted on a spindle 4 actuated by the mechanism within the gauge. The particular pointer 5 shown I prefer to construct with an extremely thin or fine portion 6 at the operative end. Over the instrument and enclosing the dial and indicator is a cover plate 7, and these are generally made of transparent glass secured on the casing of the instrument in various ways not necessary to describe herein.

Generally speaking, instruments of this kind have a more or less normal value to be indicated when the device is in operation, and it is this indication that it is generally desired to read accurately and clearly. On the particular instrument shown in Fig. 1, this particular point happens to be adjacent the point 15 on the scale, it being understood that this is merely illustrative.

As shown, I provide the plate 7 with a convex portion 8 of the desired size which substantially constitutes a magnifying or enlarging lens, which enlarges or magnifies the readings as well as the end 6 of the indicator. This convex portion may be formed integral with the cover plate 7 as shown, or may be separate therefrom and secured to the cover plate in any suitable manner, for example, by transparent cement. I have indicated at 9 by dotted line how the lens might be made separate and mounted at this point on the face of the plate. Obviously, as the pointer moves, it may be seen through the cover plate and readings very accurately and clearly seen when the end of the pointer is under the lens. It is also possible to use very fine scale graduations under the lens or at the normal reading point in the scale. The lens serves also to attract the attention of the operator that the pointer is in normal position, or vice versa, immediately attracting his attention if it is out of a normal indicating position.

In Fig. 4, I have shown a cover plate 11 with a lens 12 similar to the lens 8 shown, but in this case the same is extended as at 13 so as to enlarge the area that will be magnified. In Fig. 6, 14 represents the cover plate provided with the lens 15 similar to lens 8, but with two extensions 16 and 17. In Fig. 7, the cover plate 18 is provided with an extended convex portion 19, being substantially horseshoe shape, affording a wide range of magnification. In Fig. 8, 20 represents the plate provided with the convex portions 21 and 22, this type being particularly adapted where a thermometer 23 is also contained within and made a part of the instrument.

In the construction shown in Figs. 9 and 10, 25 represents the casing and 24 a cover plate arranged over the dial 26. I have here shown the lens 28 mounted in a frame and carried by the support 29 secured to the casing or equivalent supporting means. Fig. 11 is a face view of a recording gauge or instrument in which 30 represents the cover plate and 31 a chart, over which the marking hand 32 travels and records its movements on the chart. With this particular type of instrument, I prefer to provide a magnifying convex portion 33 arranged to extend over the marking on the chart.

With all of the constructions shown, the indications are clearly displayed and readable at a distance from the instrument. The construction is simple and inexpensive, and, as before mentioned, not only gives a clear reading, but calls the attention of the engineer or observer to the readings, especially if the same is not normal. Where in the claims I refer to dial, or scale, I wish to be understood as including a dial, scale, chart or the like for a gauge, thermometer or other indicating or recording instrument.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In an indicating device, a casing, a dial mounted in the casing, an indicating pointer, a transparent cover plate, and a relatively small lens formed unitary with the transparent plate, said plate being adapted to be assembled with the casing and dial to magnify a predetermined portion of the dial.

2. In combination with a gauge having a graduated face, of a transparent cover plate for said face, and a magnifying lens unitary with said plate and positioned relative the graduations to cover a predetermined number of units of the same.

3. In combination with a gauge having a scale, of a transparent cover for said scale, and a magnifying lens carried by said cover and covering a portion of said scale with the remaining portion of said scale visible through said cover.

4. The combination with a gauge having a graduated face, of a transparent cover plate for said face, and a magnifying arc-shaped lens unitary with said plate and positioned relative to the graduations to cover a predetermined number of units of the same.

In testimony whereof, I have hereunto signed my name.

ALEXANDER D. ROSE.